Patented Aug. 11, 1925.

1,549,503

UNITED STATES PATENT OFFICE.

ERNST PREISWERK AND HEINZ MORITZ WÜEST, OF BASEL, SWITZERLAND, ASSIGNORS TO THE HOFFMAN-LA ROCHE CHEMICAL WORKS, OF NEW YORK, N. Y., A CORPORATION OF NEW YORK.

ALLYL ARSONIC ACID AND ITS COMPOUNDS AND PROCESS OF MAKING THE SAME.

No Drawing.  Application filed June 14, 1921. Serial No. 477,573.

*To all whom it may concern:*

Be it known that we, ERNST PREISWERK and HEINZ MORITZ WÜEST, both citizens of Switzerland, and residents of Basel, Switzerland, have invented certain new and useful Improvements in an Allyl Arsonic Acid and Its Compounds and Process of Making Same, of which the following is a specification.

Our invention relates to a process for the manufacture of the heretofore unknown allyl arsonic acid by treating alkali metal arsenite with allyl halide in aqueous solution and in the presence of an excess of alkali.

Through the researches of G. Meyer (Berichte der Deutschen Chemischen Gesellschaft, vol. 16, 1883, page 1440) a process for the manufacture of primary aliphatic (i. e. alkyl) arsonic acids has become known, which consists in treating alkyl halides with alkali metal arsenites. This reaction however very often did not lead to the desired result and even with the modified form as described by Klinger and Kreutz (Liebig's Annalen der Chemie, vol. 249, 1889, page 145) the same observation was made. This experience induced Dehn (American Chemical Journal, vol. 33, 1905, page 131) to further modify the process. For the manufacture of ethylarsonic acid he treated potassium arsenite ($K_3AsO_3$) in the presence of alcohol with ethyl iodide and introduced a rapid current of chlorine into the mixture after the reaction in order to separate the iodine in free form. He proceeded in the same manner for the production of n-propyl arsonic acid (Journal of the American Chemical Society, vol. 28, 1906, page 252). The manufacture of aliphatic arsonic acids is so far completed by the researches mentioned that Prof. Gilbert T. Morgan (Organic Compounds of Arsenic and Antimony, London 1918, page 62) stated that the processes devised by G. Meyer and by Dehn for preparing methyl arsonic and other alkyl arsonic acids rendered the production of these drugs easily practicable.

However, Dehn's process for the manufacture of easily soluble primary aliphatic (i. e. alkyl) arsonic acids cannot be used for the synthesis of allyl arsonic acid, as allylarsonic acid immediately decolorizes bromine water and takes up chlorine in the same manner as bromine. Dehn and McGrath state furthermore (Journal of the American Chemical Society, vol. 28, 1906, page 359–360) that allyl iodide and potassium arsenite appeared to react abnormally, first a brown precipitate being formed and then a yellow oil. They did not determine exactly what was produced by the reaction. They simply determined the quantity of transformed arsenite, which determination, however, in no wise justifies any conclusion to be drawn as to the formation of arsonic acid compounds. This is proved by the reaction of iodoform with potassium arsenite where a transformation of arsenite up to 92.2 per cent was observed (Journal of the American Chemical Society, vol. 28, 1906, page 359 and page 360). Gutmann (Berichte der Deutschen Chemischen Gesellschaft, vol. 52, 1919, page 213–214) has proved, that by transformation of tri-alkali metal arsenite with iodoform the arsenite is oxidized quantitatively to arsenate, whereby iodoform is transformed into methylene iodide and no arsenic carbon bonding is produced.

The production of allyl arsonic acid in good yields is possible according to the process of the present application, which is carried out in aqueous solution and in the presence of an excess of alkali.

The allylarsonic acid has the graphic formula:

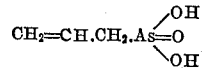

and crystallizes from alcohol or water in colorless needles or coarse prisms melting at 129–130° C. to a colorless liquid. The acid is rather easily soluble in water. The reaction of the aqueous solution is acid and dyes Congo paper blue. Being a di-basic acid it forms primary and secondary salts. Its chemical properties correspond with its composition. The acid yields a white silver salt which is easily soluble in diluted nitric acid; it is not precipitated by allowing a magnesia mixture or calcium chloride to act upon its cold ammoniacal solution, but, on being heated with these agents, it precipitates a white magnesium or calcium salt. Being an unsaturated compound it decolorizes bromine water and soda-alkaline solution of permanganate. The primary sodium salt crystallizes from diluted alcohol, (in which solvent when cold it is difficultly soluble), in shining white tablets melting partly at 87–88° C. in their water of crystallization. It is not hygroscopic and reacts nearly neutral, whereas the secondary salt is hygroscopic and reacts strongly alkaline. The aqueous solution of the primary sodium salt remains stable on being boiled and may be sterilized at 120° C. without fear of decomposition. Mineral acids decompose the acid and its salts when boiled, arsenious acid being at the same time re-formed. With a series of heavy metals, such as for instance zinc, lead, copper, cobalt, iron, the acid forms insoluble salts.

Allyl arsonic acid may be used as starting material for the manufacture of pharmaceutical products, namely its salts can be used for therapeutic purposes. Owing to the ready decomposition of the allyl group, the acid is quickly and easily absorbed and the arsenic consequently acts very promptly.

The following additional properties of some of the salts are here stated:

The mono-sodium salt.

The primary sodium salt of allyl arsonic acid crystallizes from alcohol in small shining plates. Its water of crystallization evaporates but partly in the open air. This neutrally reacting salt is very easily soluble in water. At boiling heat it dissolves also in 3 to 4 parts of alcohol. In ether it is practically insoluble. If to its 5 per cent aqueous solution a neutral solution of a soluble calcium or magnesium salt is added, the solution will remain clear. It is only after the addition of ammonia and possibly after some heating that the difficultly soluble secondary salts of the alkali earth metals separate from the solution.

The calcium salt.

The acid calcium salt (primary salt) is rather easily soluble in cold water, decidedly more difficultly soluble in boiling than in cold water.

The neutral calcium salt (secondary salt) is difficultly soluble and is less soluble in hot than in cold water. Thus 100 parts of the saturated solution at 15° C., contain 0.154 parts of the calcium salt, and at boiling heat only 0.070 parts of the calcium salt.

The ferric salt.

The ferric salt of allyl arsonic acid is a reddish powder which is insoluble in water, but soluble in hydrochloric acid.

The potassium salts.

The primary salt is soluble in water and in alcohol, is a white crystalline mass, and is quite hygroscopic. Its aqueous solution has a somewhat alkaline reaction.

The secondary salt closely resembles the secondary sodium salt, its aqueous solution is quite alkaline in reaction. This salt is quite hygroscopic.

There is also a hyper-acid salt, e. g., perhaps a molecular compound of the primary potassium salt with the acid. This salt can be formed by dissolving 16.6 grams of the acid in 20 c. c. of absolute alcohol and adding 10 c. c. of 5 $n$.KOH. On cooling the hyper-acid separates out as shining white scales which can be recrystallized from alcohol without decomposition. It is readily soluble in water, the solution being acid to Congo paper.

Example 1.

10 parts of arsenious acid anhydride are dissolved in 46 parts of a 10-$n$ (i. e., about 40%) solution of sodium hydroxide and shaken with 8 parts of allyl chloride, until the lighter layer of the mixture remains constant. After having removed this layer, the aqueous solution is diluted, neutralized with hydrochloric acid; then is added an excess of ammonia and the unchanged arsenious acid is precipitated by the addition of the quantity of calcium chloride just sufficient for the purpose. After having filtered off the calcium arsenite, the filtrate is heated to boiling point and the calcium salt of allyl arsonic acid precipitated with an excess of calcium chloride (solution 1:1). The precipitated calcium salt is drawn off, washed in order to separate it from sodium chloride, and transformed into the acid by heating with oxalic acid or with diluted sulphuric acid in a convenient manner. After having removed the calcium oxalate or sulphate, the filtrate is concentrated by heating and the allyl arsonic acid is obtained by evaporation or by cooling and may be crystallized from water or alcohol.

Example 2.

33 parts of arsenious acid anhydride are dissolved in 142 parts of a 40 per cent solution of sodium hydroxide, whereupon 33 parts of allyl chloride are added. The two layers being continually stirred, the mixture is heated in a manner which avoids any loss of allyl chloride. When the quantity of allyl chloride no longer diminishes, the excess of allyl chloride is separated from the alkaline solution and hydrochloric acid is added to the latter, until it reacts feebly alkaline upon litmus paper, whereupon the solution is evaporated, any local over-heating being avoided. The mixture thus obtained is, while cooling, transformed with as much concentrated hydrochloric acid as proves necessary for the purpose, the liquid part of the pulp is removed and the allyl arsonic acid obtained, after removal of small quantities of water and hydrochloric acid, by extraction with absolute alcohol. The allyl arsonic acid besides some arsenious acid and small quantities of sodium chloride is dissolved and from this solution the allyl arsonic acid may be obtained by evaporation and crystallization. By crystallization from water any small admixtures of arsenious acid may be removed. The yield is good.

*Example 3.*

5 gravimetrical parts of arsenious acid anhydride are dissolved in 15 volume parts of a 10.5-n solution of caustic potash and mixed so long with 9.3 gravimetrical parts of allyl iodide, until arsenious acid is no longer discernible. Then are added 25 volume parts of water and the same quantity is distilled off the diluted liquid. The residue is feebly acidified with diluted hydrochloric acid, some few by-products are removed after addition of animal charcoal by filtering (thereby leaving a solution of the potassium salt of allyl arsonic acid) and after having again diluted the mixture the calcium salt of allyl arsonic acid is precipitated from the hot ammoniacal solution with a solution of calcium chloride. The calcium salt is washed free of halogenides and transformed, as described in Example 1, into the free allyl arsonic acid with diluted sulphuric or oxalic acid.

*Example 4.*

99 gravimetrical parts of arsenious acid anhydride, dissolved in 300 volume parts of a solution of sodium hydroxide of the specific gravity 1.38, are mixed with 145 gravimetrical parts of allyl bromide, until arsenious acid is no longer perceptible. The further treatment is the same as described in Example 3.

We claim:

1. As new products, allyl arsonic compounds which have the following characteristics:

Allyl arsonic acid has the graphic formula—

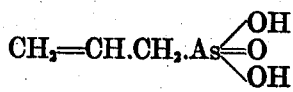

and crystallizes from alcohol or water in colorless needles or coarse prisms melting at 129–130° C., is rather easily soluble in water and its aqueous solution dies Congo paper blue, is di-basic, forms primary and secondary salts, forms a white silver salt and a white magnesium salt and a white calcium salt, and forms insoluble salts with zinc, lead, copper, cobalt and iron; the primary sodium salt crystallizing from diluted alcohol in shining white tablets melting partly at 87–88° C., in their water crystallization.

2. The herein described new compounds containing the bivalent acid-forming radical,

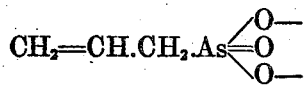

the acid containing two hydrogen atoms being di-basic, soluble in water, and in alcohol, crystallizing from such solutions in colorless needles or coarse prisms which melt at 129 to 130° C., the aqueous solution of the acid coloring Congo paper blue, the primary and secondary alkali metal salts being soluble in water, the primary sodium salt being readily soluble in hot alcohol and difficultly soluble in cold alcohol, and crystallizing from alcohol as shining white tablets, which are substantially non-hygroscopic, the aqueous solution of which is nearly neutral, the secondary sodium salt being hygroscopic and strongly alkaline in reaction, the silver salt being soluble in dilute nitric acid, the zinc, lead, copper, cobalt and iron salts being not readily soluble in water under ordinary conditions, the calcium and magnesium salts being stable in the presence of water, and the secondary calcium and magnesium salts being not readily soluble in water.

3. As new chemical products, the herein described sodium salts of allyl-arsonic acid, these being soluble in water, the secondary salt being very hydroscopic and its solution being alkaline in reaction, the primary salt being soluble in water and in alcohol, and being non-hygroscopic and its solution being practically neutral in reaction.

4. As new products, the alkali metal salts of allyl-arsonic acid.

5. A step in the process of making allyl arsonic acid and its salts, which consists in treating a tri-alkali metal arsenite in aqueous solution and in the presence of an excess of alkali with an allyl halide insoluble in the liquid and insoluble in an aqueous solution of the allyl arsonate.

In witness whereof we have hereunto set our hands.

ERNST PREISWERK.
HEINZ MORITZ WÜEST.